July 10, 1962 L. E. VARADI 3,043,560
TURBINE COOLING SYSTEM
Filed Jan. 28, 1960
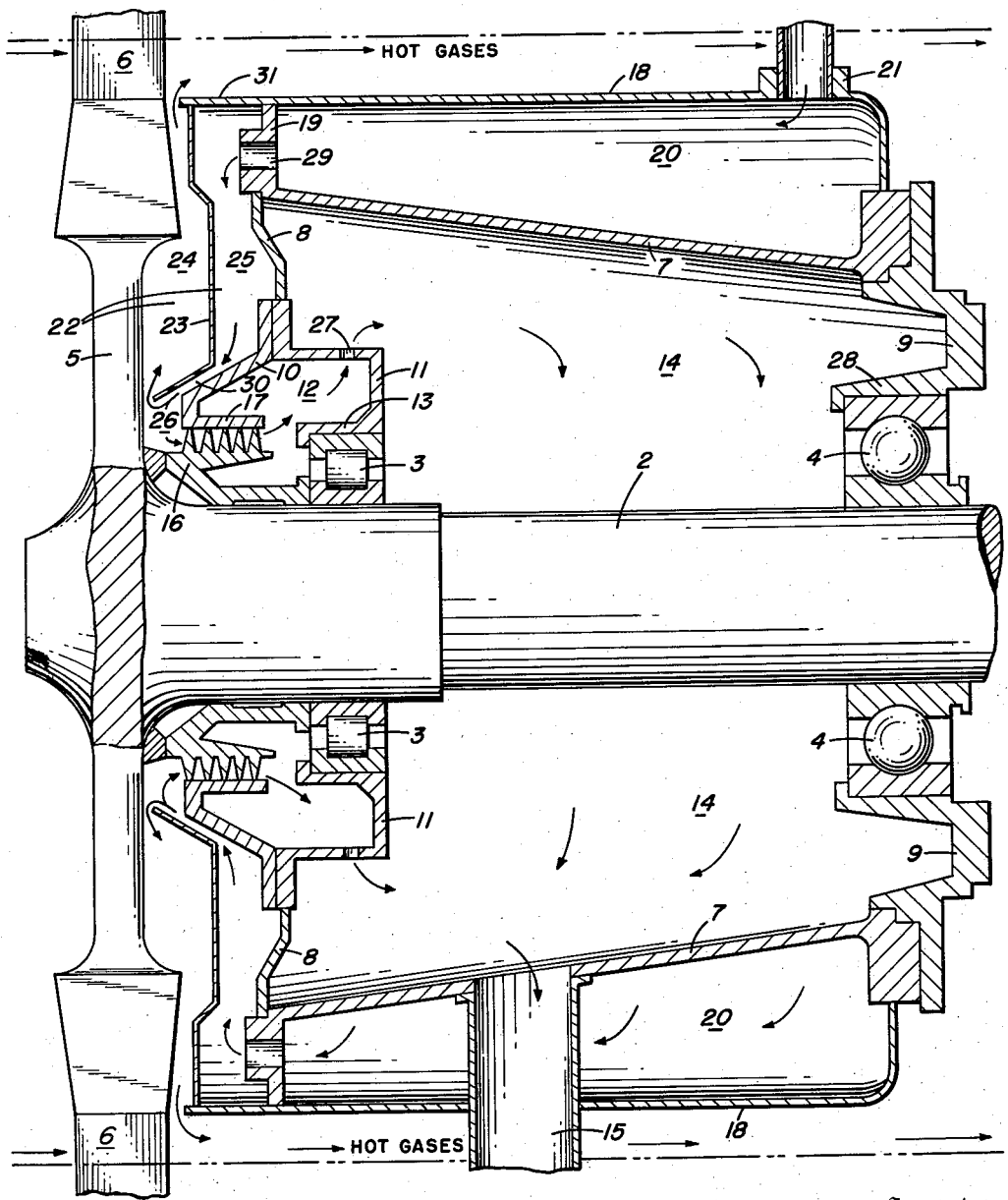
Inventor
LOUIS E. VARADI
By R. J. Tompkins
Attorney 3,043,560
TURBINE COOLING SYSTEM
Louis E. Varadi, Danvers, Mass., assignor, by mesne assignments, to the United States of America as represented by the Secretary of the Navy
Filed Jan. 28, 1960, Ser. No. 5,312
3 Claims. (Cl. 253—39.15)

The present invention relates to a system for cooling a turbine engine and more particularly to a system for cooling the shaft bearings, wheel and blades of a turbine engine.

One of the most critical problems confronting designers of turbine engines has been providing a system for cooling bearings for the turbine shaft especially those bearings located immediately aft of the turbine wheel. This has been due to the fact that heat from the hot motive gases travels behind the turbine wheel in the area of the bearings and the bearings are not otherwise adequately insulated from the hot motive gas chamber. This difficulty has been overcome in the present invention by providing a particular structure forming air passages within the engine thus exposing specific portions of the structure to cooling air. By this structure the supporting members for the bearings, the bearings themselves and areas in the vicinity of the bearings are cooled in a novel manner. Also, the present invention solves other problems in the art such as cooling the after side of the turbine wheel, the blades mounted thereon, preventing the lubricating oil and oil mist for the bearings from escaping through a labyrinth seal or packing gland, and further preventing a scavenger oil pump for scavenging the bearing oil from drawing a vacuum on itself.

An object of the present invention is to provide particular cooling air paths within a turbine engine which will more efficiently cool turbine components.

Another object of the present invention is to provide a turbine structure that will more efficiently prevent the heating of the turbine shaft bearings by the hot motive gases.

A further object of the invention is to provide a turbine structure with particular cooling air paths which will more efficiently cool the turbine bearings, wheel, and blades, prevent the lubricating oil for the bearings from leaking through packing glands, and prevent the scavenger pump for scavenging oil from drawing a vacuum on itself.

Other objects and many of the attendant advantages of this invention will be readily appreciated as the same becomes better understood by reference to the following detailed description when considered in connection with the accompanying drawing wherein:

The single FIGURE of the drawing shows a longitudinal sectional view of an illustrated embodiment of the invention.

In the drawing a shaft 2 supported by a roller bearing 3 and a ball bearing 4 has a wheel 5 with blades 6 mounted thereon and extending into the stream of gases. Circumscribing the shaft 2 and the bearings 3 and 4 is an inner annular shell 7 having a first forward portion 8 and an after or rearward portion 9. Forward portion 8 is divided at its inner end into a first annular member 10 directed in a forward direction and a second annular member 11 directed in an after or rearward direction defining a first annular area 12. Second annular member 11 has an annular lip 13 which supports the outer race of bearing 3 and after portion 9 has an annular lip 28 which supports the outer race of bearing 4. It is now visualized that shell 7 with its various portions and the bearings define a second annular area 14. This latter area and area 12 are to provide chambers for lubricating oil and oil mist for bearings 3 and 4. A scavenger oil drain line 15 connected to a pump (not shown) opens into area 14 for scavenging the oil and oil mist. Areas 12 and 14 are open to each other through a plurality of openings 27 in member 11 and both areas are sealed from the forward part of the engine by a labyrinth seal or packing gland 16 which is mounted on shaft 2 and which seals against lip 17 of member 10. Circumscribing shell 18 is exposed to hot motive gases on its outer side and forms an inner casing for the motive gases within the turbine. Shell 18 is closed at its after or rearward end and having a second forward portion 19 whereby the shell defines a third annular area 20. Cooling air is introduced into area 20 through line 21 which is connected to a compressed air source (not shown). Cooling air leaves area 20 through a plurality of openings 29 in portion 19. Portion 19 and portion 8 with member 10 are located predetermined distance aft of wheel 5 defining an annular area 22. A baffle 23 divides area 22 into a forward annular area 24 and an after annular area 25. The inner end of baffle 23 is directed forwardly in the vicinity of member 10 forming a forwardly directed passage 30 between the baffle and member 10. The end of baffle 23 terminates a predetermined distance from wheel 5 maintaining a sufficient pressure within area 26 so that a predetermined amount of compressed air travels from area 26 into areas 12 and 14 through seal 16. The annular baffle area 25 is completely sealed at its outer end by an extension 31 of shell 18 and annular area 24 is open at its outer end to the hot motive gas chamber.

In the operation of the illustrated embodiment compressed air from a compressor source (not shown) is introduced into the third annular area 20 through line 21 after which it travels through openings 29 into annular baffle area 25. The area 20 acts as a buffer between the intense heat in the hot gas chamber and area 14 and the air flowing through openings 29 cools member 19 thus causing member 19 to act as a dam preventing heat flow from the hot metal shell 18 through the portion 8 and member 11 to bearing 3. From area 25 the air travels into area 26 in which latter area it splits into two separate air flows, one being outwardly from area 26 into area 24 and the other leaking through seal 16 into the first and second annular areas 12 and 14. The air flow into area 24 cools the wheel 5 and blades 6 after which it passes into the hot motive gas stream thus preventing hot gases from entering area 24. The other air flow directly cools the lubrication oil and oil mist in areas 12 and 14 and directly cools the bearings 3 and 4 and thereafter exits area 14 through line 15 which is connected to a scavenger pump (not shown). It will be noted that not only does the air leak from area 26 into areas 12 and 14 prevent oil leaking through the seal 16 into area 26 but this air within area 14 will prevent the scavenger pump (not shown) which is connected to line 15 from drawing a vacuum on itself.

Obviously many modifications and variations of the present invention are possible in the light of the above teachings. It is therefore to be understood that within the scope of the appended claims the invention may be practiced otherwise than as specifically described.

What is claimed is:

1. In a turbine engine having a shaft, a turbine wheel mounted on one end of the shaft, and blades mounted on the wheel, a device for cooling the turbine engine comprising a forward mounted bearing and an after mounted bearing for said shaft, a first annular shell defining a first annular area between the forward mounted bearing and a portion of the shaft between the forward mounted bearing and the wheel for containing a lubricant, a second annular shell circumscribing said shaft and connecting the first annular shell and the after mounted bearing forming a second annular area, a third annular shell circumscribing the second annular shell forming a third annular area, a forward baffle plate located between the wheel and the first, second and third annular shells extending from the outer limits of the third annular shell to a point in close proximity with the shaft forming a forward baffle area, an inlet to said third annular area, said third annular area containing at least one opening to the forward baffle area, a labyrinth seal between the shaft and said first annular area, said first annular shell containing at least one opening into the second annular area, and an outlet from said second annular area whereby a cooling gas enters said inlet, passes through the third annular area, then passes to the forward baffle area where a predetermined portion of the cooling gas flows to the wheel and blades and the remaining portion of the cooling gas passes through the labyrinth seal into the first annular area to cool the bearing and to combine with oil therein to form a mist which passes into the second annular chamber to effect cooling and lubrication of the forward and after mounted bearings before passing out of the system through said outlet.

2. In a jet engine having a shaft, bearings mounted on the forward and rearward portions of said shaft, a turbine wheel mounted on one end of said shaft for rotation therewith, a plurality of blades mounted on the periphery of said wheel, a device for cooling said turbine wheel and bearings comprising a first annular shell circumscribing said forward mounted bearing and forming a first annular area, a second annular shell circumscribing said shaft from said first annular shell to said rearward mounted bearing forming a second annular area therebetween, a third annular shell circumscribing said second annular shell forming a third annular area, a forward baffle plate located intermediate said turbine wheel and the forward end of said shells, said baffle plate extending radially inward toward said shaft forming a baffle area, inlet means to said third annular shell, outlet means from said second annular shell, means interconnecting said third annular area to said baffle area, means for interconnecting said baffle area to said first annular area, means interconnecting said first annular area to said second annular area whereby said cooling gases flow through said inlet means to said outlet means thus effecting cooling of said turbine wheel, blades and bearings.

3. In a jet engine having a shaft, a first and second bearing mounted on the forward and after portions of said shaft, respectively, said first and second bearings rotatably supporting said shaft, a turbine wheel mounted on said shaft, a plurality of blades fixedly secured to said turbine wheel, an improved system for cooling said wheel and bearings comprising a first radial wall located downstream from said turbine wheel and extending radially outward from said forward bearing, a second wall extending radially outward from said rearward bearing, said first wall having a first and second portion immediately adjacent said forward bearing forming a first annular area, inlet and outlet means from said first annular area, a first annular shell concentric with said shaft and being secured to said first and second walls at its forward and rearward ends, respectively, said first annular shell cooperating with said first and second walls to form a second annular area, said outlet means from said first annular area also serving as the inlet of said second annular area, outlet means from said second annular area, a second annular shell concentric with said first annular shell and located radially outward therefrom, said second annular shell being secured to said first and second radial walls at the outermost ends of said radial walls forming a third annular area, inlet means in said second annular shell leading to said third annular area, outlet means in said first radial wall interconnecting said third annular area with the area between said first radial wall and the downstream side of said wheel, an annular baffle fixedly secured to the forwardmost end of said second annular shell and extending radially inward toward said first portion of said first wall whereby relatively cool gas enters said third annular area, passes through said first radial wall and passes radially inward between said baffle and said first radial wall, at the innermost end of said baffle said gases take two diverse paths, one path being radially outward immediately forward of said baffle to cool said turbine wheel, the other path being through said first annular area thus cooling said forward mounted bearing thence into said second annular area further cooling said forward bearing and permitting said rearward mounted bearing and said shaft to be cooled by said gases flowing therethrough.

References Cited in the file of this patent
UNITED STATES PATENTS

| | | |
|---|---|---|
| 2,401,826 | Halford | June 11, 1946 |
| 2,759,700 | Wheatley | Aug. 21, 1956 |
| 2,822,974 | Mueller | Feb. 11, 1958 |
| 2,932,156 | Eckert et al. | Apr. 12, 1960 |
| 2,973,136 | Greenwald | Feb. 28, 1961 |